(12) United States Patent
Kimblad et al.

(10) Patent No.: US 10,926,458 B2
(45) Date of Patent: Feb. 23, 2021

(54) MANUFACTURING METHOD, MANUFACTURING APPARATUS, DATA PROCESSING METHOD, DATA PROCESSING APPARATUS, DATA CARRIER

(71) Applicant: Digital Metal AB, Höganäs (SE)

(72) Inventors: Hans Kimblad, Höganäs (SE); Ralf Carlström, Höganäs (SE); Cornelia Olsérius, Höganäs (SE); Bo Rosenquist, Höganäs (SE)

(73) Assignee: DIGITAL METAL AB, Höganäs (SE)

( * ) Notice: Subject to any disclaimer, the term of this patent is extended or adjusted under 35 U.S.C. 154(b) by 538 days.

(21) Appl. No.: 15/528,467

(22) PCT Filed: Nov. 18, 2015

(86) PCT No.: PCT/EP2015/076988
§ 371 (c)(1),
(2) Date: May 19, 2017

(87) PCT Pub. No.: WO2016/079193
PCT Pub. Date: May 26, 2016

(65) Prior Publication Data
US 2017/0326789 A1    Nov. 16, 2017

(30) Foreign Application Priority Data
Nov. 19, 2014  (GB) ...................... 1420603

(51) Int. Cl.
*B29C 64/153*    (2017.01)
*B29C 64/165*    (2017.01)
(Continued)

(52) U.S. Cl.
CPC ............ *B29C 64/153* (2017.08); *B22F 3/003* (2013.01); *B22F 3/008* (2013.01); *B29C 64/165* (2017.08);
(Continued)

(58) Field of Classification Search
CPC ..... B29C 64/153; B29C 64/40; B29C 64/165; B33Y 50/02
See application file for complete search history.

(56) References Cited

U.S. PATENT DOCUMENTS 5,658,412 A    8/1997  Retallick et al.
6,021,358 A *  2/2000  Sachs ................ B33Y 50/00
                                                700/98

(Continued)

FOREIGN PATENT DOCUMENTS

EP    1486318 A2    12/2004
EP    1851007 B1     4/2010
(Continued)

OTHER PUBLICATIONS

International Search Report and Written Opinion for PCT/EP2015/076988 dated Feb. 4, 2016, 11 pages.
(Continued)

*Primary Examiner* — Alison L Hindenlang
*Assistant Examiner* — Debjani Roy
(74) *Attorney, Agent, or Firm* — Lowe Graham Jones PLLC

(57) ABSTRACT

A method of manufacturing an object is provided. The method comprises depositing a first layer of construction material on a build platform. The method comprises depositing binder onto the first layer of construction material to bind at least a region of the first layer together to form a support layer. The method comprises depositing a second layer of construction material on the support layer to form a spacer layer. The method comprises depositing a third layer of construction material on the spacer layer. The method comprises depositing binder selectively onto the third layer to bind one or more regions of the third layer together to form a first layer of the object. Also provided are data processing methods, program carriers, data processing appa- (Continued)

ratus and manufacturing apparatus for implementing the method.

12 Claims, 5 Drawing Sheets

(51) Int. Cl.
 *B22F 3/00* (2021.01)
 *B29C 64/40* (2017.01)
 *B33Y 50/02* (2015.01)
 *B29C 67/04* (2017.01)
(52) U.S. Cl.
 CPC .............. *B29C 64/40* (2017.08); *B29C 67/04* (2013.01); *B33Y 50/02* (2014.12); *B22F 2998/10* (2013.01)

(56) References Cited

U.S. PATENT DOCUMENTS

| | | | | |
|---|---|---|---|---|
| 6,066,285 | A * | 5/2000 | Kumar | .................. G03G 15/224 264/317 |
| 6,363,606 | B1 * | 4/2002 | Johnson, Jr. | ............ B22F 3/008 29/854 |
| 2004/0239009 | A1 * | 12/2004 | Collins | .................. B33Y 30/00 264/497 |
| 2010/0042241 | A1 | 2/2010 | Inoue | |
| 2013/0244040 | A1 | 9/2013 | Oshima | |
| 2016/0236412 | A1 * | 8/2016 | Kusahara | .............. B22F 1/0062 |
| 2020/0038956 | A1 * | 2/2020 | Hirota | ................... B22F 3/1055 |

FOREIGN PATENT DOCUMENTS

| | | |
|---|---|---|
| JP | 2004-358968 A | 12/2004 |
| JP | 2008307728 A | 12/2008 |
| JP | 2009255479 A | 11/2009 |
| JP | 2013-184405 A | 9/2013 |
| WO | 2008044693 A1 | 4/2008 |
| WO | 2014125258 A2 | 8/2014 |
| WO | 2014208743 A1 | 12/2014 |

OTHER PUBLICATIONS

Search Report for priority application GB1420603.1, dated May 8, 2015, 3 pages.
Notice of Rejection dated Apr. 24, 2019 for co-pending Taiwanese Patent Application No. 104137942; 4 pages; English translation 2 pages.
Office Action; Taiwanese Application No. 104137942; dated Dec. 6, 2018; 17 pages.
Japanese Office Action dated Oct. 8, 2019 with English summary for co-pending Japanese Patent Application No. 2017-526942; pp. 11.
European Examination Report dated Nov. 28, 2019 for co-pending European Patent Application No. 15797091.4; pp. 5.
Japanese Office Action dated Apr. 28, 2020 with English translation for co-pending Japanese Patent Application No. 2017-526942; pp. 13.

* cited by examiner

MANUFACTURING METHOD, MANUFACTURING APPARATUS, DATA PROCESSING METHOD, DATA PROCESSING APPARATUS, DATA CARRIER

PRIORITY CLAIMS

This invention claims priority to PCT Application Serial No. PCT/EP2015/076988 filed Nov. 18, 2015, which claims priority to Great Britain Application Serial No. 1420603.1 filed Nov. 19, 2014. The contents of which are hereby incorporated by reference.

TECHNICAL FIELD

The present disclosure relates to methods of manufacturing an object, and particularly methods of manufacturing an object in which the object is constructed from a series of layers of construction material, regions of each of which are selectively bound by deposition of a binder onto each layer. The present disclosure also relates to manufacturing apparatus for employing such a method, as well as data processing methods for processing object data for control of such an apparatus, data carriers implementing program instructions for carrying out such methods, and data processing apparatus for implementing such methods.

BACKGROUND

Three-dimensional printing is a class of additive manufacturing technologies in which sequential layers of material are deposited into a build region, portions of each layer being joined together so that a desired object is constructed by the joint portions of the sequential layers.

One three-dimensional printing technique employs a process in which sequential layers of a granular material, such as a powder, are deposited into a build region from a print head which passes over the build region. To selectively bind regions of the build material together, a liquid binder is jetted from the print head onto the granular material using a technique similar to ink-jet printing. The deposited layers of powder are made sufficiently thin such that, when successive layers of granular material are deposited having selective regions bound together by the liquid binder, the bound parts of each layer form a contiguous three-dimensional structure extending through the layers.

The binder may be a binder which solidifies or cures, thereby to bind the granules of the granular material together, over time, for example by contact with the air in the case of an air-drying adhesive. Alternatively, the binder for each layer may need to be cured, for example using ultraviolet light in the case of a UV-curable adhesive.

For 3D printing to be competitive with other manufacturing processes, including traditional subtractive manufacturing, 3D printing must be able to produce objects to a high accuracy, and particularly must be able to reproduce a design which is intended to be manufactured to a high degree of precision and to good tolerance.

Accordingly, there is a need for a method of manufacturing objects, together with associated apparatus and data processing equipment and methods, which enables objects to be manufactured to a high quality and particularly to be manufactured to a reproducibly high degree of accuracy to the intended design.

SUMMARY

According to a first aspect of the present invention, there is provided a method of manufacturing an object. The method comprises depositing a first layer of construction material on a build platform. The method comprises depositing binder onto the first layer of construction material to bind at least a region of the first layer together to form a support layer. The method comprises depositing a second layer of construction material on the support layer to form a spacer layer. The method comprises depositing a third layer of construction material on the spacer layer. The method comprises depositing binder selectively onto the third layer to bind one or more regions of the third layer together to form a first layer of the object.

In one implementation, the region of the first layer which is bound together includes a region arranged directly below the first layer of the object.

In one implementation, the region of the first layer which is bound together includes substantially all the first layer.

In one implementation, the region includes one of an apertured portion, a mesh portion, or a grid portion in which apertures are formed.

In one implementation, the region is contiguous.

In one implementation, the spacer layer has a thickness such that binder from the third layer cannot penetrate to the support layer.

In one implementation, the binder of the support layer is different from the binder of the object layer.

In one implementation, a spacer layer is deposited onto the support platform before the first layer is deposited.

In one implementation, the deposition of binder to the first layer is carried out with a different spatial resolution than the deposition of binder to the third layer.

In one implementation, further layers of construction material are deposited and binder is deposited selectively onto each further layer to bind one or more regions of each further layer together to form a successive layers of the object In one implementation, the construction material comprises metal powder and/or ceramic powder.

According to a second aspect of the present invention, there is provided a method of processing object data. The method comprises acquiring data representing the structure of an object. The method comprises generating data representing the structure of a support layer to be provided beneath the object during manufacturing of the object. The method comprises combining the data representing the structure of an object and the data representing the structure of a support layer to form combined data representing the structure of the object arranged above the support layer. The method comprises outputting the combined data.

In one implementation, the method comprises determining the spatial extent in a plane of a support layer to be provided beneath the object during manufacturing of the object. In the implementation, data representing the structure of a support layer is generated based on the determined spatial extent.

According to a third aspect of the present invention, there is provided data carrier carrying program instructions configured to control data-processing equipment to perform a method in accordance with the second aspect.

According to a fourth aspect of the present invention, there is provided a apparatus for processing object data. The apparatus comprises an acquisition unit operable to acquire data representing the structure of an object. The apparatus comprises a generation unit operable to generate data representing the structure of a support layer to be provided beneath the object during manufacturing of the object. The apparatus comprises a combining unit operable to combine the data representing the structure of an object and the data representing the structure of a support layer to form combined data representing the structure of the object arranged above the support layer. The apparatus comprises an output unit operable to output the combined data.

According to a fifth aspect of the present invention, there is provided an additive manufacturing apparatus. The apparatus comprises a support surface. The apparatus comprises a construction material deposition unit arranged for relative movement in at least a first direction across the support surface for depositing a construction material incrementally in layers on the support surface. The apparatus comprises a binding unit arranged for relative movement in at least a first direction across the support surface for depositing a binder selectively to locations on each deposited layer. The apparatus is configured to carry out a method in accordance with the first aspect.

BRIEF DESCRIPTION OF THE DRAWINGS

For a better understanding of the present disclosure, and to show how the same may be carried into effect, reference will be made, by way of example only, to the accompanying drawings, in which.

DETAILED DESCRIPTION

The present disclosure relates to 3D printing technologies in which an object is constructed from a series of successively deposited layers, portions of which are joined together both within the layer and with portions of an underlying layer. In particular, the present disclosure relates to powder bed and ink jet head 3D printing, in which binder is selectively jetted from a scanning ink jet head onto a powder bed of granular construction material.

Figure 1:
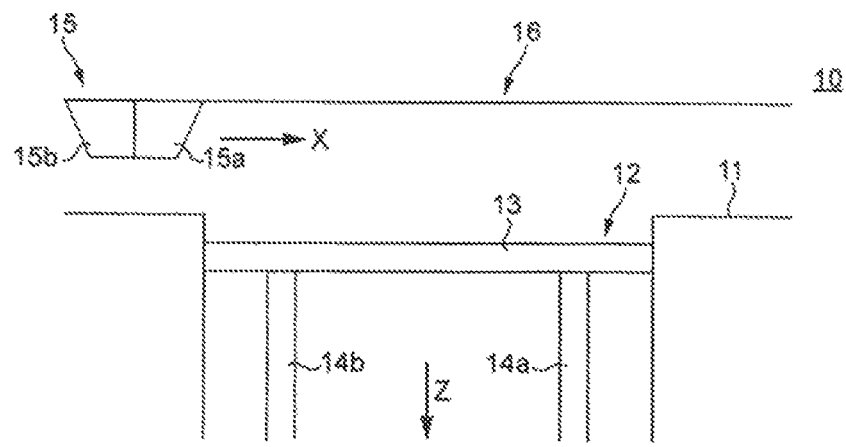
FIGS. 1 to 6 show steps in one implementation of the present disclosure in a schematic manufacturing apparatus.

FIG. 1 shows a schematic view of a powder bed and ink jet head 3D printing apparatus 10. 3D printing apparatus 10 has a print table 11, into an upper surface of which well 12 is formed. Within well 12 is formed displaceable platform 13, which is arranged to be displaceable within well 12 in a first direction Z, which, in the configuration of FIG. 1, is perpendicular to the surface plane of table 11. Platform 13 is supported by retractable supports 14a and 14b, which are retractable in a controlled manner to effect the lowering of platform 13 into well 12. Retractable supports 14a, 14b may, for example, be provided with toothed portions which enable the supports 14a and 14b to be retracted in a controlled manner through the operation of co-operating toothed wheels, in the manner of a rack and pinion drive. Alternatively, retractable supports 14a and 14b may be hydraulically retractable or retractable through some other means, as may be available.

Apparatus 10 also includes print head 15, which is arranged to traverse above well 12 in a first direction X, while being supported above the well as it translates. In the embodiment of FIG. 1, print head 15 is supported on rail 16, along which it is arranged to move. Print head 16 may be moved in a reciprocating fashion over well 12 by, for example, a drive belt, a drive screw, an internal drive motor or any other suitable means. Importantly, print head 15 is able to traverse the full extent of well 12 in the X-direction.

It must be noted that, while the illustration of FIG. 1 depicts the XZ plane in transverse section, well 12 has extent in a third direction Y perpendicular to the X and Z directions and, for example, extending out of the page. Table 11, well 12 and platform 13 have extent in this direction also, but have no special limitation as to the shape or dimension in this direction. For example, when viewed along the Z direction, well 12 could have a rectangular shape in plan view, but also could have other shapes, including polygonal or circular. The cross-section of well 12 does not vary with extent in the Z direction, while platform 13 has a plan view so as to be a close fit to the vertical walls of well 12 relative to which platform 13 moves. Accordingly, a volume exists below the surface of table 11 between the vertical walls of well 12 and platform 13 into which powder can be dispensed such that substantially no powder leaks between sides of well 12 and the edges of platform 13. Platform 13 may be provided with seals, such as resilient wipers, at each edge to allow such a seal to be provided.

Print head 15 also has extent in the Y-direction such that print head 15 is able to pass across the entire X-Y cross-sectional extent of well 12. This can be achieved by providing a print head 15 which extends the full length of the well in the Y-direction. Alternatively, this can be achieved by providing a print head, one or more components of which are arranged to reciprocate in the Y-direction to scan the surface of the well in a raster fashion, such that, as the print head traverses the well in the X-direction, whether continuously or stepwise, the component of the print head which scans in the Y-direction passes across every point of the well.

Print head 15 includes a powder dispenser 15a adapted to dispense a layer of powder into well 12 as print head 15 traverses the well. In the present embodiment, powder dispenser 15 may have a dispensing orifice which extends the full width of well 12 in the Y-direction such that, when the print head 15 traverses well 12, a full layer of powder may be dispensed from the orifice. In alternative configurations, the powder dispenser 15a may be formed as a scanning component which dispenses successive rows of powder in the Y-direction, arranged sequentially in the X-direction. Print head 15 is adapted to selectively dispense binder to particular positions in the Y-direction as print head 15 traverses well 12 in the X-direction.

The configuration described is common to a conventional powder bed and ink jet head 3D printer as known in the art.

In the configuration of FIG. 1, binder dispenser 15b could be provided as a scanning ink-jet head which is operable to deposit drops of binder at predetermined locations in a single row in the Y-direction before the print head advances in the X-direction so that the binder dispenser 15b can selectively deposit binder at locations on a successive row. Alternatively, binder dispenser 15b may comprise a single ink jet head extending in the Y-direction, the full extent of the well 12 in the Y-direction and having a plurality of orifices arranged in a row in at least the Y-direction such that, by activating individual orifices of the binder dispenser 15*b* while the print head 15 translates across well 12 in the X-direction, binder may be deposited to selected locations in the X-Y plane of the well. A combination of these approaches is also possible, in which the binder dispenser may be arranged to translate in the Y-direction, but may also include plural orifices arranged in at least the Y-direction. The orifices may also be arranged in the X direction, for example as a tilted linear array, for example in order to achieve closer spacing in the Y-direction as between the orifices.

Print head 15 may additionally include one or more smoothing devices, such as a doctor blade or smoothing roller, arranged thereon and adapted to level the upper surface of the dispensed powder layer as print head 15 traverses well 12. Such a smoothing device may be fixed or have an adjustable position in at least the Z direction.

Further, for use with binders which require active curing, for example by a UV light, print head 15 may include a curing unit, such as a UV lamp. Such a curing unit may be provided on either side of the binding unit, such that the curing unit acts to cure either binder that has just been dispensed by the binding unit or binder of the previous layer to the layer onto which binder is being dispensed in the present printing pass.

The operation of the embodiment of FIG. 1 will now be described. In FIG. 1, the upper surface of platform 13, which, in the embodiment of FIG. 1 is flat and parallel to the X-Y plane, has been retracted a short distance below the surface of Table 11 to provide a build region into which a layer of powder may be dispensed.

From the configuration shown in FIG. 1, print head 15 traverses well 12 in the X-direction to deposit a layer of powder into the well on the surface of platform 13. Also as the print head passes, the binder dispenser 15*b* selectively deposits binder onto portions of the deposited layer to selectively bind portions of that layer together. In the configuration of FIG. 1, the powder and binder are simultaneously dispensed in the same path, the powder being dispensed to a location relatively advanced in the X-direction as compared with the location at which the binder dispenser is able to dispense binder, although other printing patterns are possible. In particular, where time is required to allow the powder to settle before the binder is deposited, the powder can be deposited in a first pass in the X-direction and the binder can be deposited in a second pass in the X-direction.

Figure 2:
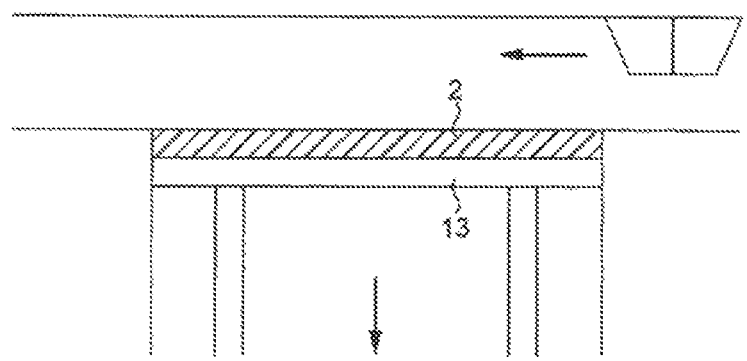

In the present implementation, the first layer of powder which is deposited on platform 13 does not form part of the object to be manufactured. In the implementation, the first layer of powder 2 forms a support layer as will be explained below. To form this support layer as shown in FIG. 2, the binder is deposited to cover substantially all the first layer 2. This thickness of layer 2 may be adjusted such that the entire depth of layer 2 becomes bound with the binder deposited from binder dispenser 15*b*.

Figure 3:
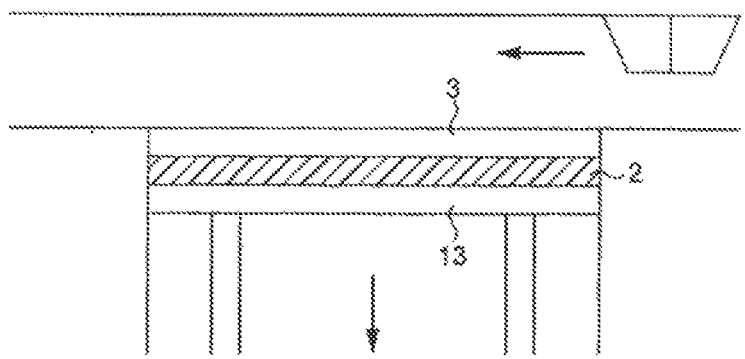

Once layer 2 has been deposited and bound, platform 13 is further lowered and a further layer 3, termed the spacer layer, is deposited on top of support layer 2 as shown in FIG. 3. No or substantially no binder is deposited into this layer, which acts to separate or space support layer 2 from further bound portions of layers deposited above layer 3.

Figure 4:
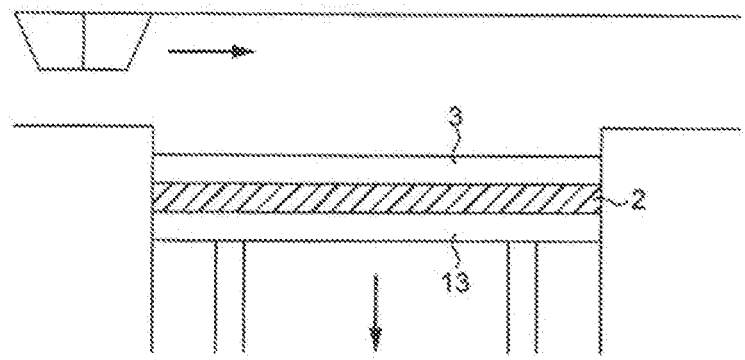

Platform 13 is again further lowered and the configuration shown in FIG. 4 is achieved. The configuration in FIG. 4 is substantially the same as the configuration shown in FIG. 4, except rather than a first layer being deposited directly on platform 13, the next layer to be deposited will be deposited on spacer layer 3, which is itself supported above support layer 2.

Figure 5:
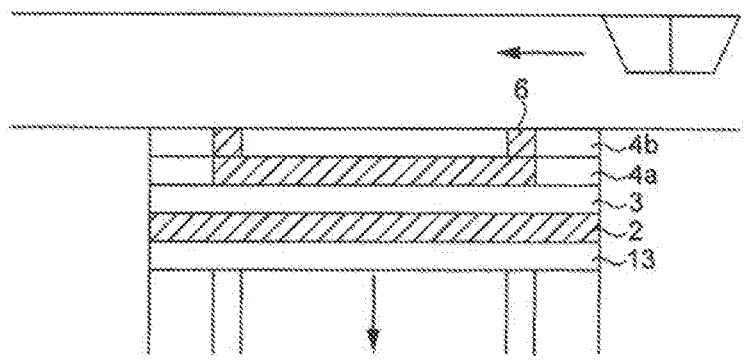

From the position shown in FIG. 4, manufacturing of a desired object may be achieved by depositing successive layers of powder with powder dispenser 15*a* and by selectively binding portions of those dispensed layers of powder with binder dispenser 15*b*. For example, after two further passes of the print head 15, the configuration shown in FIG. 5 is shown, in which object layers 4*a* and 4*b* have been successively deposited and selectively bound together to form object 6, which, in the configuration of FIG. 5, is incomplete, but is formed by portions of object layers 4*a*, 4*b* which have been bound together, both within the layer and as between the layers, by appropriate selective deposition of binder on each layer.

Figure 6:
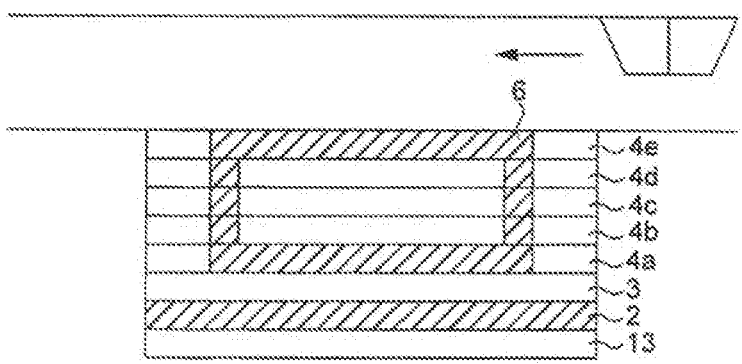

As can be seen in FIG. 6, after further layers 4*c*, 4*d* and 4*e* are successively deposited and selectively bound together, a complete object 6 is formed within well 12, which may be then removed from well 12. Depending on the binder used, and the intended application, object 6 may be sufficiently robust to be used as an end product. In other configurations, object 6 may be subjected to further processing, such as firing or sintering, to increase the strength of the object. Object 6 here is shown as a rectangular plate having a central aperture, which may be of use as, for example, a gasket or spacer, but could be any desired shape or form. The apparatus may, for example, be configured to accept object data defining an arbitrary object, the dimensions of which are limited only by the depth and cross-sectional area of well 12, and to operate print head 15 and platform 13 to deposit and selectively bind layers of powder to form the desired object. The object data may be provided as a series of pixel images or vector co-ordinates defining the deposition positions of binder on each successive layer, or may be provided as 3D object data defining only the 3D shape of the desired object.

By providing support layer 2 underlying object layers 4*a*, 4*b*, 4*c*, 4*d* and 4*e*, the inventors have found that the dimensional and shape accuracy of part 6 is improved as compared with a printing method in which no support layer 2 is formed, and only layers of unbound powder are provided between the object and the base plate. Without wishing to be bound by any particular theory, it is believed that printing a first support layer underlying at least the object stabilises the powder bed such that the addition of further binder has a less disruptive effect on the powder bed as a whole.

Figure 7:
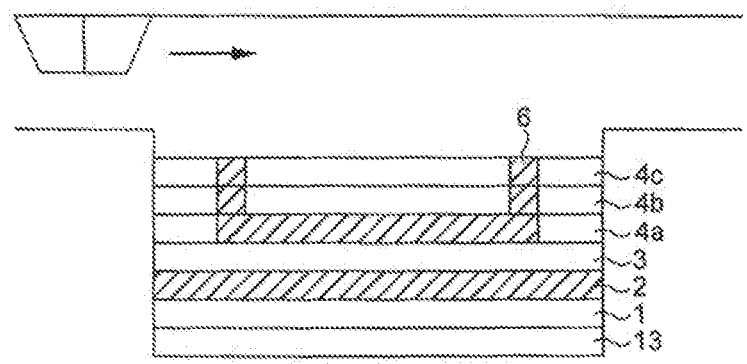
FIG. 7 shows a state in an alternative implementation of the present disclosure in a schematic manufacturing apparatus.

However, the advantages obtainable with the embodiment as described with FIGS. 1 to 6 are also achievable in a further configuration as shown in FIG. 7, in which a further spacer layer of unbound powder is provided between platform 13 and support layer 2. Such a configuration may be achievable either by depositing separator layer 1 in a first pass of print head 15 and support layer 2 in a second pass of print head 15 or simply by depositing a sufficiently large initial layer in a single pass such that the binder deposited does not penetrate all the way through the first layer contacting platform 13. Provision of separator layer 1 may in some circumstances allow an easier release of support layer 2 from platform 13 after the printing is completed.

Figure 8:
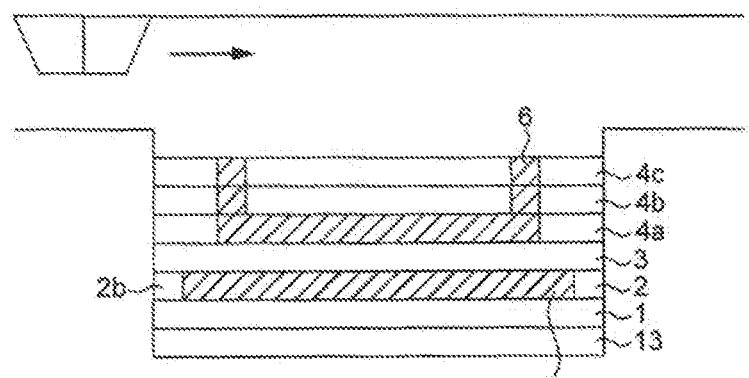
FIG. 8 shows a state in an alternative implementation of the present disclosure in a schematic manufacturing apparatus.

Although in connection with the above-described embodiments it has been described that binder is provided to substantially cover support layer 2, such that the entirety of support layer 2 is bound together, this is not essential to the performance of the invention. Advantages of the invention can also be obtained to some degree by providing a support layer in a region above which successive layers are to be bound together to form the object, but not extending across the entirety of the cross-sectional X-Y extent of well 12. For example, as shown in FIG. 8, support layer 2 has a central bound region 2a surrounded by unbound portions 2b which lie between the bound region 2a and the edge of the well. These portions may completely surround bound region 2a on all sides of the layer, or may only be provided on one or more sides.

Figure 9:
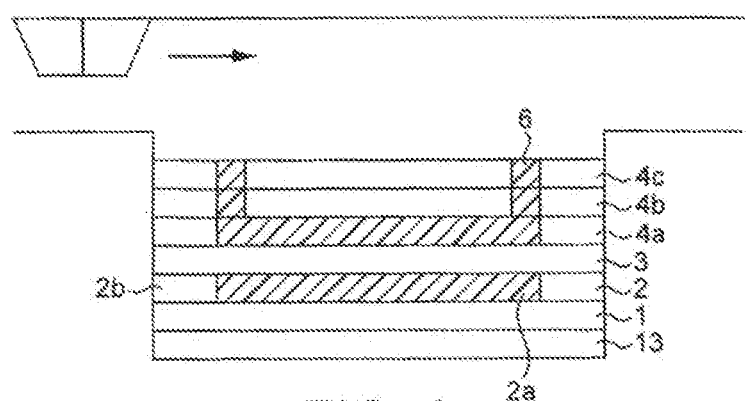
FIG. 9 shows a state in an alternative implementation of the present disclosure in a schematic manufacturing apparatus.

Although FIG. 8 shows the bound region as extending beyond those positions which are directly beneath bound portions of object layers 4a, 4b and 4c which make up object 6, as shown in FIG. 9 the bound regions of FIG. 2a may only be provided directly underneath those portions of successive object layers 4a, 4b and 4c which are to be bound together. This technique allows the amount of ink and powder which are used to be minimised, especially in the case of an object being printed which has a much smaller extent when viewed in plan projected into the X-Y plane than the X-Y extent of well 12.

Figure 10:
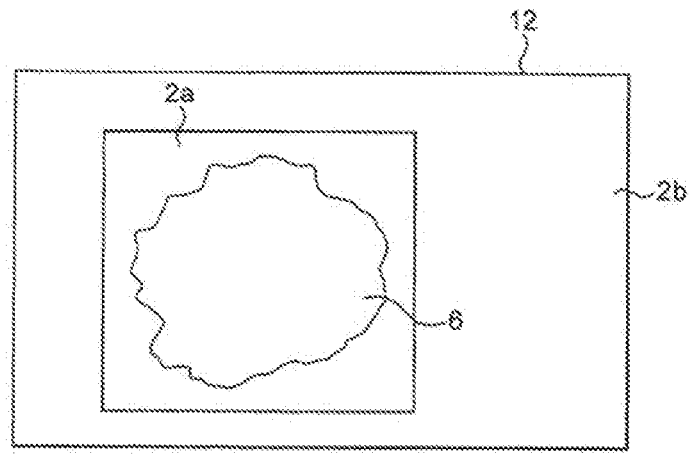
FIG. 10 shows a first schematic extent of a bound region of a support layer relative to a manufactured object.
Figure 11:
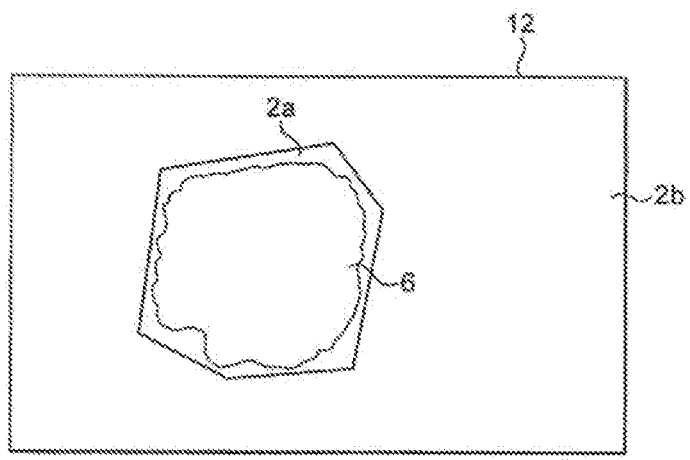
FIG. 11 shows a second schematic extent of a bound region of a support layer relative to a manufactured object.

This concept is illustrated with reference to FIG. 10, in which an irregularly shaped object 6 is printed above a support region 2a formed on a lower layer, which itself is surrounded by unbound powder to be within the support layer. FIG. 10 is a straightforward configuration in which the support layer is rectangular, but, to further save on materials, it may be permissible to use a polygonal shape closely following the contours of the plan of object 6 projected into the X-Y plane, such that substantially only portions of layer 2 are bound together which underlie object 6, as shown in FIG. 11.

Figure 12:
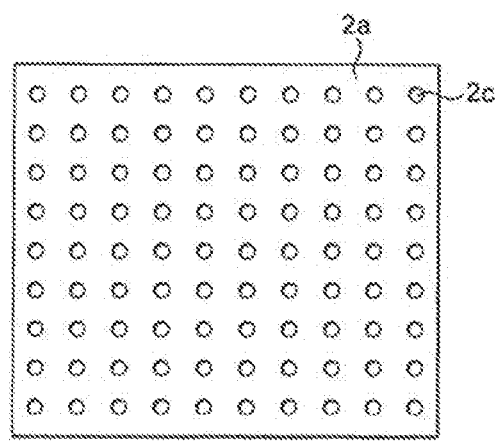
FIG. 12 shows a bound region of a support layer having apertures formed therein.

In some configurations, to further save on materials, it may be permissible to provide the bound region 2a of support layer 2 in the form of a mesh, grid or apertured plate as shown in FIG. 12. For example, as shown in FIG. 12, bound region 2a is not totally continuous, but includes apertures 2c, which may be regularly or irregularly spaced, and regularly or irregularly sized. The size of apertures 2c may be adjusted by straightforward experimentation to achieve an appropriate level of support for parts printed above the bound region 2a. In some configurations the apertures may, in aggregate, define no more than 1%, no more than 5%, no more than 10%, or no more than 20% of the area of the bound region, and individually may have a maximum dimension of no more than 1%, no more than 2%, no more than 5% or no more than 10% of the extent of the bound region in the direction associated with that dimension.

In some configurations, the manufacturing apparatus may be configured such that, on receiving object description data describing an object to be manufactured, for example, a series of pixel images showing at which position on successive layers binder should be deposited, the apparatus provides support layer 2 according to predefined parameters before depositing layers according to the object description data. Alternatively, the manufacturing apparatus may include data processing equipment operable to process the object description data to obtain a projection of the object onto the X-Y plane, and then to determining an appropriate shape and location for the bound region of the support layer in accordance with the X-Y extent of the object as described above.

However, it is also recognised that the disclosed methods may also be provided to a conventional 3D printing apparatus, by applying appropriate data processing to the object description data before it is supplied to the 3D printing apparatus. Particularly, a data processing method being an implementation of the present disclosure may include processes as shown in FIG. 13.

Figure 13:
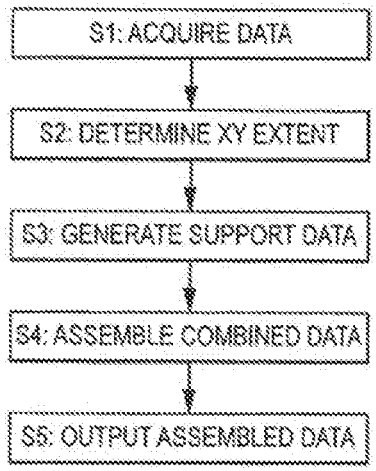
FIG. 13 shows an implementation of the present disclosure as a data-processing method.

In process S1 of FIG. 13, object description data representing an object to be manufactured is acquired. This data may be a 3D computer aided design (CAD) output file, or may be data representing the object as a series of raster slices along a given axis through the object. The data may be pixel or voxel data, or vector data, or another form of object description data. The data may be of the kind which is output from design tools or of the kind which is suitable as the print data input to a 3D printing apparatus.

In process S2 of the implementation, the extent of the object in a given plane is determined. For example, where the object is to be printed as a series of stacked layers, each layer having extent in an X-Y plane perpendicular to the stacking direction, the maximal extent of the object in that plane may be established. This can be achieved either by projecting the object onto the X-Y plane and identifying the boundary of the projection, in order to obtain a support region which precisely matches the projection of the object, or by determining the maximal and minimal coordinate along each of, for example, X and Y directions for each slice of the object, with the intent of determining a rectangular support region which will certainly underlie all portions of the object, but which may extend beyond the boundaries of the projection of the object. These respective scenarios correspond, for example, to FIG. 10 and FIG. 11, respectively, described above. For implementations in which the support region covers the entire X-Y plane, then the extent of the support region will be determined by the cross-sectional extent in the X-Y plane of the build well 12 of the intended print apparatus, which may correspond to one of a series of standard sizes, which may be provided as a definable parameter by the user or which may be determined by hand-shaking and/or negotiation with a connected manufacturing apparatus.

In process S3 of the implementation, once the X-Y extent of the support layer is determined, data representing such an object is generated, for example by generating data corresponding to a plate of defined extent arranged the X-Y plane, and having a thickness corresponding to the intended thickness of the support layer.

In process S4 of the implementation, data corresponding to the support layer is be combined with the data representing the object to create output data which, when supplied to a 3D printing apparatus, will firstly print a support of appropriate geometry and will subsequently print the intended object arranged above that support layer. For example, when the input data is a series of raster layers representing slices through the object, one or more additional slices representing unbound spacer layers and then one or more layers containing data defining the support region may be appended to the sequence of layers, such that the support layer or layers are printed before the object is printed. For example, where the object is defined by layers n=1 to n=20 in order from the bottom of the object to the top of the object, the layers corresponding to the object data may be renumbered as layers 3 to 22, and new layers 1 and 2 may be appended corresponding, respectively, to the support layer and the spacer layer. Alternatively, where the object is defined by a structure definition file such as a CAD file, the data representing the support layer may be appended by defining in the CAD file a further object in the form of a plate arranged beneath the object to function as the support layer.

In process S5 of the implementation, the combined data may be output in a suitable format. It is important to note that this method may be implemented in such a way that the input data and the output data are in different formats. For example, the input data may be a CAD file, and the output data may be a series of raster layers for input to a 3D printing apparatus, with an appropriate rasterization step being provided either after the CAD data is acquired but before the support data is appended, or alternatively after the support data and the object data are combined. Such transformations between data formats and representations may be implemented in any of the disclosed processes S1 to S5, or in intermediate processing steps, without limitation.

The data processing method may be embodied in a data carried containing program instructions adapted to cause data-processing equipment such as a general-purpose computer or an industrial controller to carry out the disclosed data-processing method.

Figure 14:
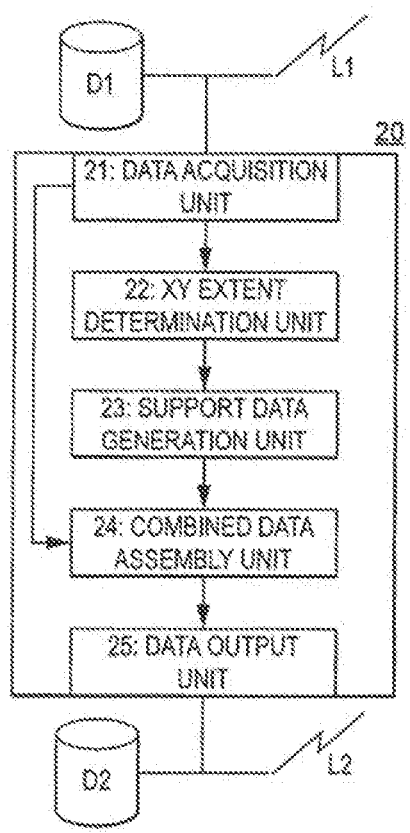
FIG. 14 shows an embodiment of the present disclosure as a data-processing apparatus.

FIG. 14 shows a block diagram of exemplary data-processing apparatus 20 implemented as a series of modules which successively operate on data flowing through the modules. The data-processing apparatus is configured to perform the disclosed data-processing method. Data processing apparatus 20 may be implemented as discrete electronics modules, or as software modules running on a general-purpose computer or an industrial controller, or by any other suitable means. Aspects of data-processing apparatus 20, including individual modules or parts of modules, may be implemented on distinct elements of a data-processing system connected by short or long-range networks, including on remote servers or mobile terminals, without limitation.

The input object data may be retrieved in one suitable format from storage D1, or from communications network L1, by a data acquisition unit 21 implementing process S1. The data retrieved by the data acquisition unit 21 may be passed to the XY extent determination unit 22 implementing process S2. The data defining the X-Y extent of the support layer may be passed to the support data generation unit 23 implementing process S3. The data defining the support layer may be passed to the combined data assembly unit 24 implementing process S4, taking account also of the data retrieved by the data acquisition unit. The combined data may then be output with the data output unit 25 implementing process S5, which may output the data in one suitable format to storage D2 or to communications network L2. Storage D2 may be identified with storage D1, and communications network L2 may be identified with communications network L2, or the respective elements may respectively be distinguished, The above disclosure is applicable to a wide variety of powder bed and ink jet head 3D manufacturing technologies, including the use of ceramic, polymer, and metal powder construction materials, and reactive, UV-curable, contact-curable or other binder classes. One particular embodiment uses a metal powder and a polymer binder. In such implementation, a sintering process may be applied to the metal powder after the object is removed from the printing apparatus.

In some embodiments, the support layer may be printed with a different printing speed or printing resolution as compared with the printing of the object layers. In some configurations, the apparatus is configured to print the support layer with a different print speed or print resolution as compared to the object layers, while in other configurations the instructions to perform this may be included in the print data supplied to the printing apparatus.

The above disclosure has been exemplified with regard to layers of approximately equal thickness, although in some configurations the support layer and/or spacer layer may have a different thickness to the object layers, and may in the case of the support layer be either thicker or thinner, and in the case of the spacer layers may also be thicker or thinner than the object layers and than the spacer layer, as desired to achieve a particular degree of stability of the powder bed or particular requirements as to the usage of the printing materials including the binder and the powder.

In some implementations, the print head may be configured to dispense different binders and/or different powders for the support layer as for the object layers. For example, the support layers may be formed using a soluble binder after the object is removed, the remaining material may be washed with a suitable solvent and the build material of the support layer at least may be recycled.

In some configurations, a separate print head may be used for forming the support layers as compared with the print head used for forming the object layers.

Although the above disclosure have been made with regard to a print head which reciprocates in at least a first direction above a well defining the printing region, the above disclosure is also applicable to applications in which a print head is arranged radially from a central axis of a build region and sweeps a circular path around the axis of the build region to deposit powder and/or binder into the circular build region. In such a configuration, a reciprocating movement of the print head may not be provided, but instead the print head may continuously rotate in one circular sense or the other.

The above disclosures are considered only exemplary, it is expected that those skilled in the art will be able to implement the above disclosure with such modifications, substitutions, alternatives or variations as may be required to meet particular engineering requirements without undue burden.

The invention claimed is:

1. A method of manufacturing an object, comprising:
depositing a first layer of construction material on a build platform;
depositing binder onto the first layer of construction material to bind at least a region of the first layer together to form a support layer;
depositing a second layer of construction material on the support layer to form a spacer layer;
depositing a third layer of construction material on the spacer layer;
depositing binder selectively onto the third layer to bind one or more regions of the third layer together to form a first layer of the object,
wherein the region of the first layer includes one of an apertured portion, a mesh portion, or a grid portion in which apertures are formed.

2. The method according to claim 1, wherein at least a portion of the region of the first layer which is bound together is arranged directly below the first object layer.

3. The method according to claim 1, wherein the region of the first layer which is bound together includes substantially all the first layer.

4. The method according to claim 1, wherein the region of the first layer is contiguous.

5. The method according to claim 1, wherein the spacer layer has a thickness such that binder from the third layer cannot penetrate to the support layer.

6. The method according to claim 1, wherein the binder of the support layer is different from the binder of the object layer.

7. The method according to claim 1, wherein a first spacer layer is deposited onto the support platform before the first layer of construction material is deposited.

8. The method according to claim 1, wherein the deposition of binder to the first layer is carried out with a different printing resolution than the deposition of binder to the third layer.

9. The method according to claim 1, wherein the construction material comprises metal powder and/or ceramic powder.

10. The Method according to claim 1, wherein further layers of construction material are deposited and binder is deposited selectively onto each further layer to bind one or more regions of each further layer together to form a successive layers of the object.

11. An additive manufacturing apparatus comprising:
a support surface;
a construction material deposition unit arranged for relative movement in at least a first direction across the support surface for depositing a construction material incrementally in layers on the support surface;
a binding unit arranged for relative movement in at least a first direction across the support surface for depositing a binder selectively to locations on each deposited layer,
wherein the apparatus is configured to perform a method of manufacturing an object, comprising:
depositing a first layer of construction material on a build platform;
depositing binder onto the first layer of construction material to bind at least a region of the first layer together to form a support layer;
depositing a second layer of construction material on the support layer to form a spacer layer;
depositing a third layer of construction material on the spacer layer; and
depositing binder selectively onto the third layer to bind one or more regions of the third layer together to form a first layer of the object,
wherein the region of the first layer includes one of an apertured portion, a mesh portion, or a grid portion in which apertures are formed.

12. A method of manufacturing an object, comprising:
depositing a first layer of construction material on a build platform;
depositing binder onto the first layer of construction material to bind at least a region of the first layer together to form a support layer;
depositing a second layer of construction material on the support layer to form a spacer layer;
depositing a third layer of construction material on the spacer layer;
depositing binder selectively onto the third layer to bind one or more regions of the third layer together to form a first layer of the object,
wherein the region of the first layer includes one of a holed portion, a mesh portion, or a grid portion in which holes are formed.

* * * * *